United States Patent [19]
Wensink et al.

[11] Patent Number: 5,330,173
[45] Date of Patent: Jul. 19, 1994

[54] HAND SCANNER APPARATUS

[76] Inventors: Gary L. Wensink, 1005 'E' St. NW., Miami, Okla. 74354; Paul E. Keyes, Jr., 2111 Cascade Dr., Killeen, Tex. 76542

[21] Appl. No.: 29,718
[22] Filed: Mar. 11, 1993
[51] Int. Cl.$^5$ .............................................. B65H 5/06
[52] U.S. Cl. ................... 271/240; 271/248; 271/270; 358/473; 358/496
[58] Field of Search ............... 271/226, 240, 248, 270; 358/473, 496

[56] References Cited
U.S. PATENT DOCUMENTS

| | | | |
|---|---|---|---|
| 4,962,526 | 10/1990 | Kotani | 358/473 X |
| 5,124,801 | 6/1992 | Shinmura | 358/473 X |
| 5,182,450 | 1/1993 | Pan | 358/473 X |
| 5,227,909 | 7/1993 | Watson | 358/473 X |

Primary Examiner—Richard A. Schacher
Attorney, Agent, or Firm—S. Michael Bender

[57] ABSTRACT

A hand scanner support and paper guide apparatus is disclosed for mechanically scanning a thin sheet, e.g. a sheet of paper, using a scanner designed to be hand-held. The apparatus includes a housing which includes a planar upper wall which serves as a flat surface along which the thin sheet is moved. A support assembly is connected to the housing and supports the scanner a spaced distance above the planar upper wall as the thin sheet is moved past the scanner. A guide assembly is connected to the housing and guides the thin sheet in a straight path as the thin sheet is moved along the planar upper wall. A drive assembly is housed within the housing and moved the thin sheet past the scanner. The drive assembly includes a driven, thin-sheet-contacting element such as a cylindrical roller; and a slot, in the planar upper wall, permits the cylindrical roller to contact and move the thin sheet as it lies on the planar upper wall. The scanner support assembly includes a first support element which supports the scanner from below the scanner; and the scanner support assembly also includes a second support element which supports the scanner from above the scanner. The first support element may be a U-shaped bar that extends across the planar upper wall in spaced relation thereto. The second support element may be a flexible strap.

17 Claims, 4 Drawing Sheets

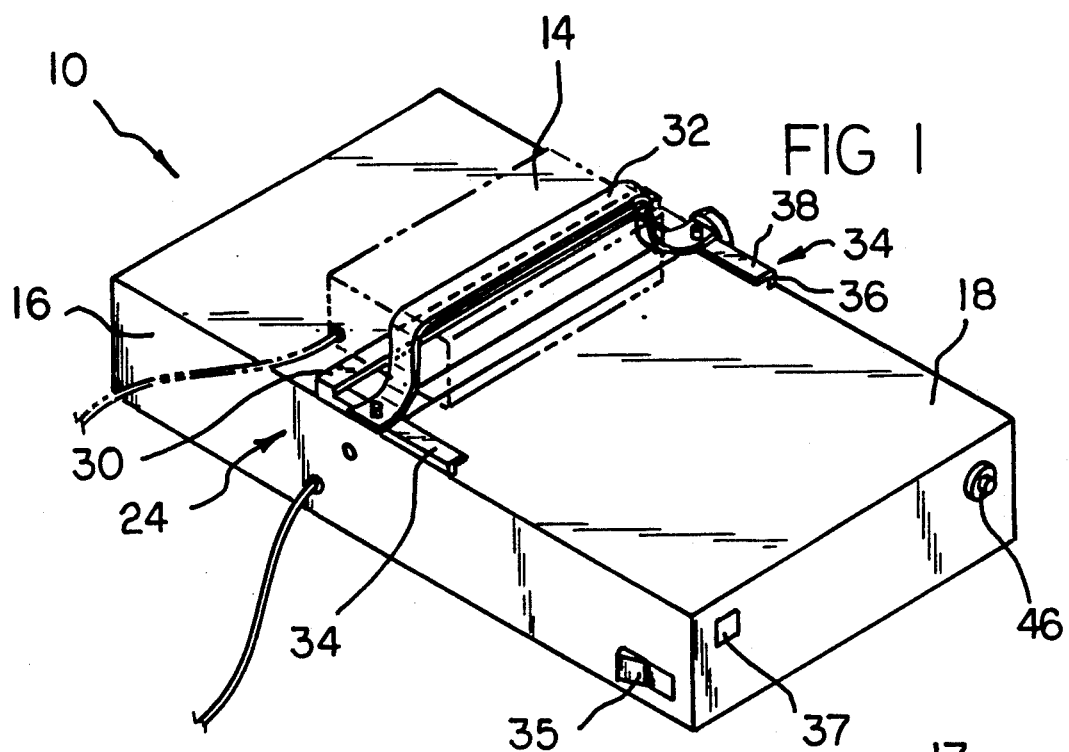
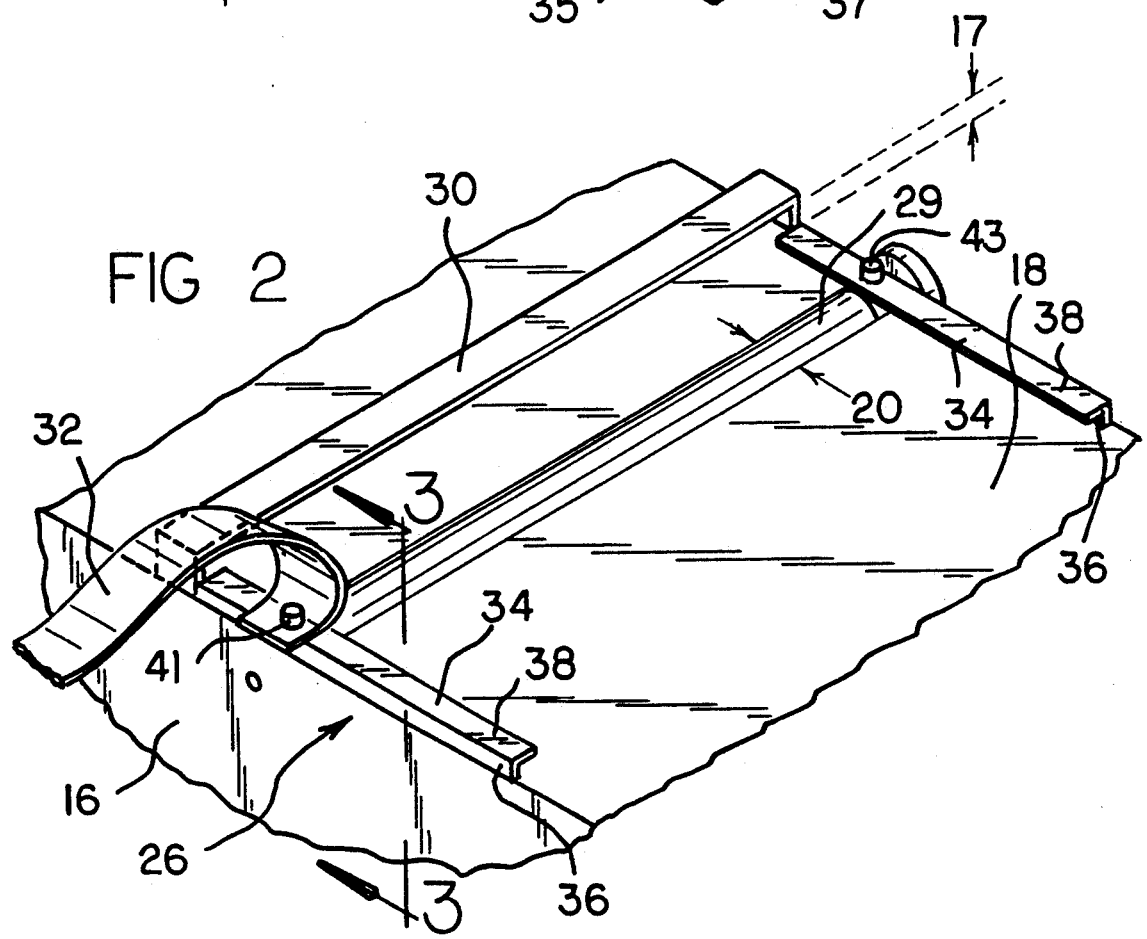

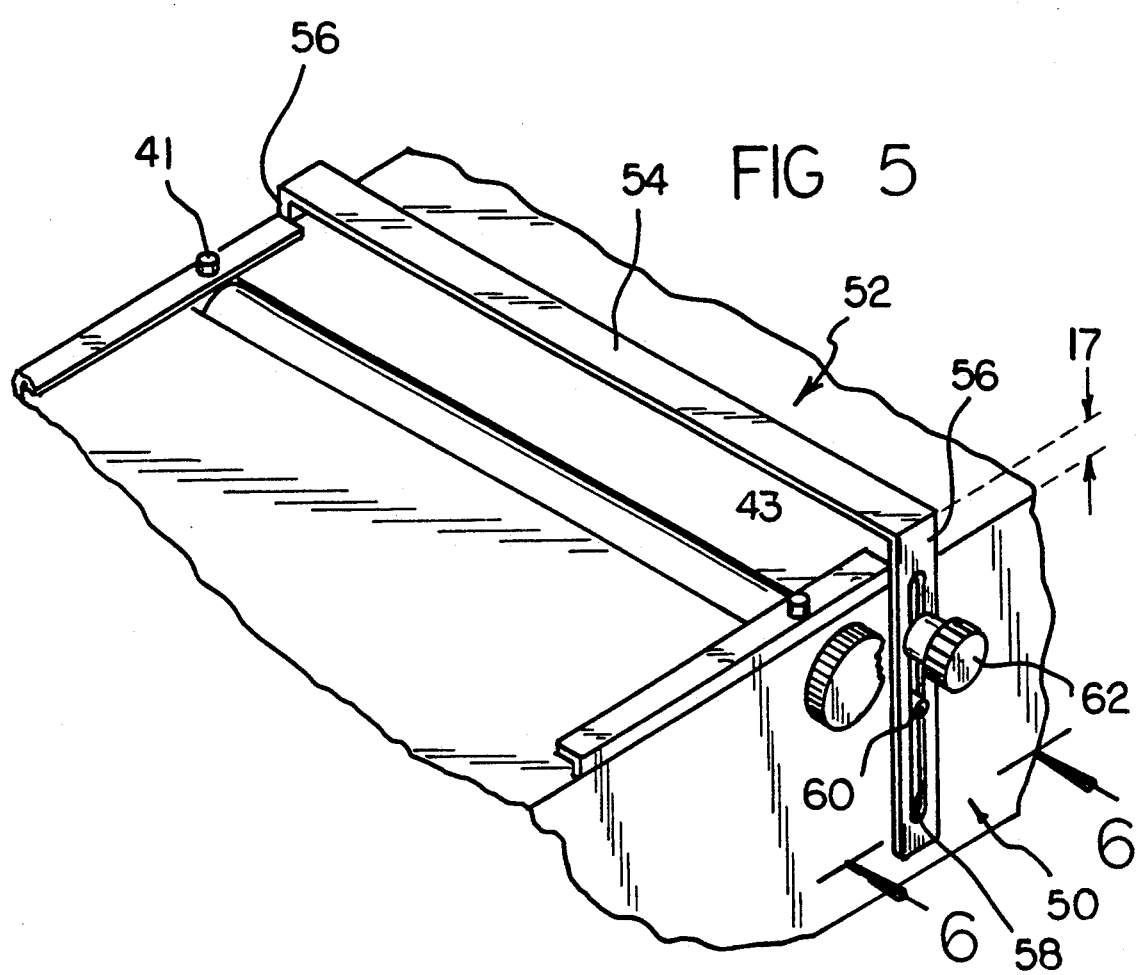
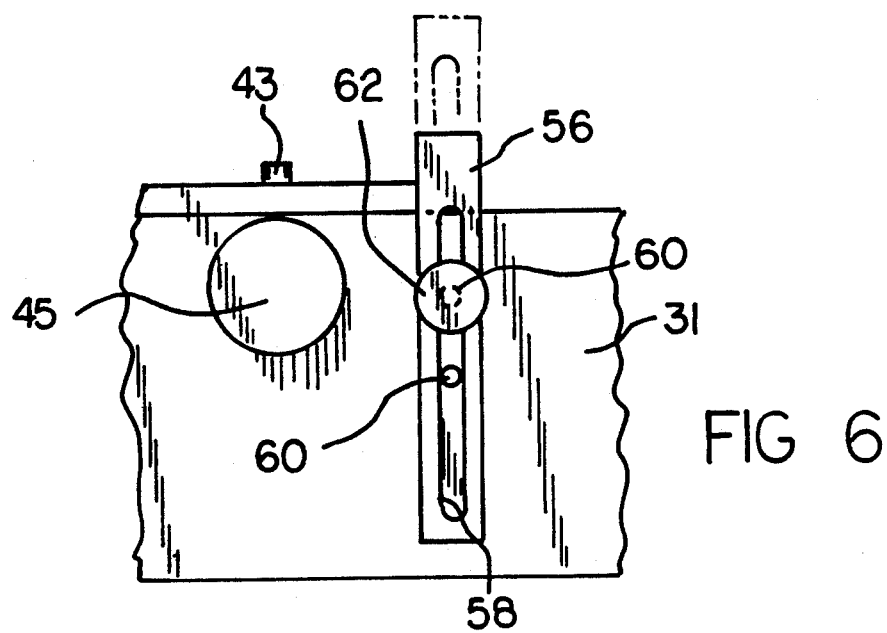

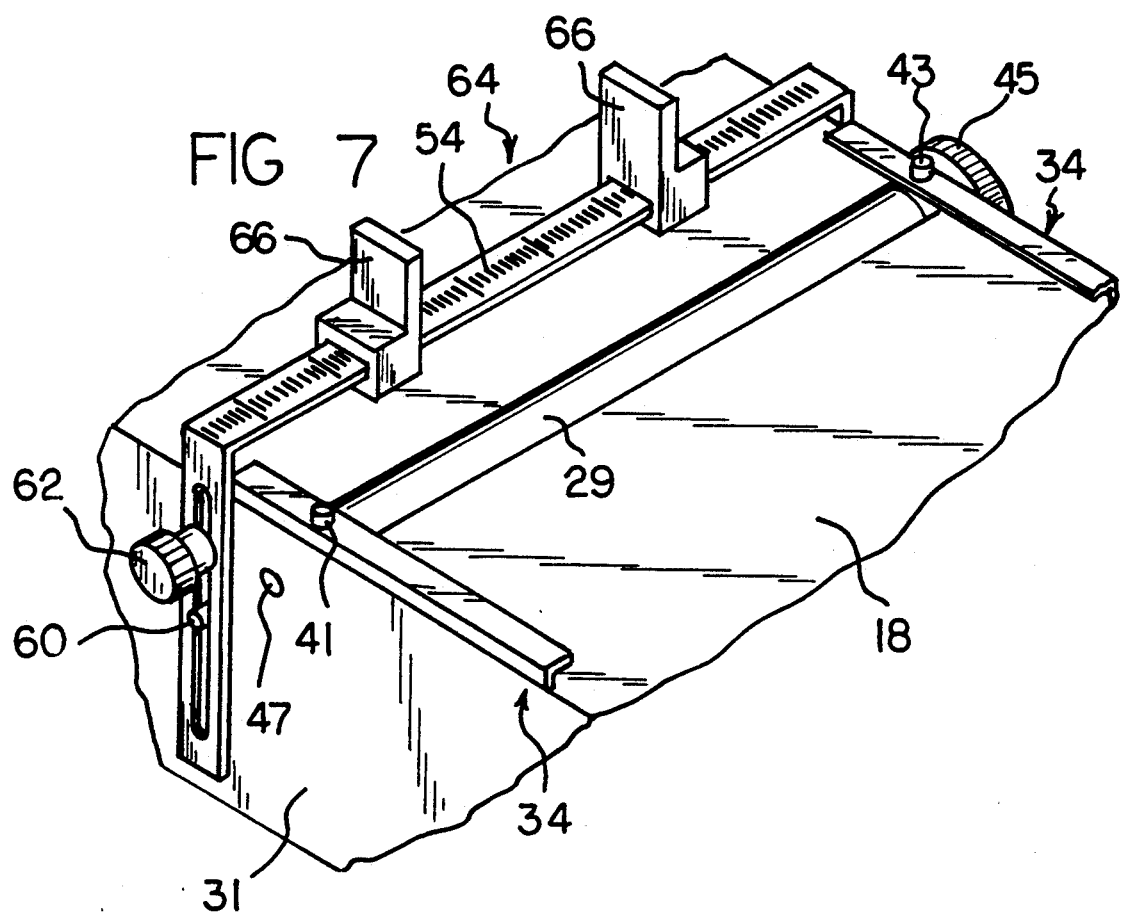
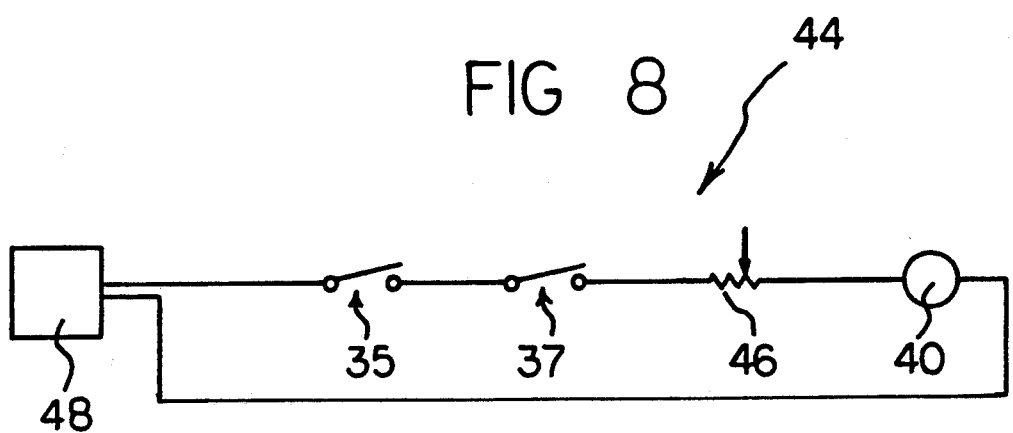

HAND SCANNER APPARATUS

BACKGROUND OF THE INVENTION

1. Field of the Invention

The present invention relates generally to scanners for scanning pages and the like into computers which contain scanning software, and more particularly, to a device especially adapted to effect smooth and consistent scanning with a hand-held type scanner.

2. Description of the Prior Art

Scanners which employ a solely mechanical scanning mechanism are well known in the art. In addition, hand-held scanners that are controlled solely by a person's hand are also well known in the art. Problems associated with solely mechanical scanning mechanisms are that they are usually quite complicated and expensive, and they are not readily portable. A major problem associated with hand-held scanners that are controlled solely by a person's hand is that the scanning operation is often of uneven texture of blurred because of uneven hand movement.

Solely mechanical scanners are disclosed in the following U.S. patents: U.S. Pat. No. Des. 303,660 of Yamagiwa et al and U.S. Pat. No. 4,961,117 of Rumley. Hand-held scanners that are controlled solely by a person's hand are disclosed in the following U.S. Pat. Nos. 4,804,949 of Faulkerson; 4,805,175 of Knowles; and 4,953,113 of Chadima et al.

One of the important beneficial features of a hand-held scanner is that such a scanner is relatively inexpensive compared to a solely mechanical scanner. Although the prior art does not provide so, it would be desirable if a scanning apparatus were provided that had the beneficial features of both a solely mechanical scanner and a solely hand-held scanner. More specifically, it would be desirable is a scanner apparatus were provided that had the versatility and portability of a hand-held scanner and, at the same time, had the consistency and reproducability of a mechanical scanner.

Because hand-held scanners are relatively inexpensive and because they are so versatile and portable, many computer users prefer hand-held scanners. Nevertheless, it would be desirable if a hand-held scanner could be retrofitted to be mechanically operated when desired.

Thus, while the foregoing body of prior art indicates it to be well known to use complex mechanical scanners and simple hand-held scanners, the provision of a simple and cost effective device that has the benefits of both mechanical and hand-held scanners is not contemplated. More specifically, the prior art does not provide the versatility and portability of a hand-held scanner and, at the same time, the consistency and reproducability of a mechanical scanner in the same scanning apparatus. The prior art does not provide a hand-held scanner that can be retrofitted to be mechanically operated when desired. The foregoing disadvantages are overcome by the unique hand scanner support and paper guide apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a hand scanner support and paper guide apparatus for mechanically scanning a thin sheet, e.g. a sheet of paper, using a scanner designed to be hand-held. The apparatus includes a housing which includes a planar upper wall which serves as a flat surface along which the thin sheet is moved. A support assembly is connected to the housing and supports the scanner a spaced distance above the planar upper wall as the thin sheet is moved past the scanner. A guide assembly is connected to the housing and guides the thin sheet in a straight path as the thin sheet is moved along the planar upper wall. A drive assembly is housed within the housing and moves the thin sheet past the scanner. The drive assembly includes a driven, thin-sheet-contacting element such as a cylindrical roller; and a slot, in the planar upper wall, permits the cylindrical roller to contact and move the thin sheet as it lies on the planar upper wall. The scanner support assembly includes a first support element which supports the scanner from below the scanner; and the scanner support assembly also includes a second support element which supports the scanner from above the scanner. The first support element may be a U-shaped bar that extends across the planar upper wall in spaced relation thereto. The second support element may be a flexible strap. The guide assembly includes a pair of L-shaped bars attached to the housing, such that the bars provide lateral guide walls and vertical guide walls for the thin sheet; and the guide vertical guide walls are spaced from the planar upper wall.

The drive assembly may include an electric motor, a driven, thin-sheet-contacting element comprised of cylindrical roller, and a gear assembly connected between the electric motor and the cylindrical roller for driving the roller by the motor. The cylindrical roller is supported by side walls of the housing.

The scanner support assembly may include an adjustable height assembly for adjusting the spaced distance of the scanner above the planar upper wall of the housing. The adjustable height assembly may include an adjustable-height, U-shaped support bar assembly which includes a horizontal portion for supporting the scanner and two vertical portions, projecting down from the horizontal portion, for adjusting the spaced distance of the scanner above the planar upper wall of the housing. Each of the two vertical portions includes a slot. Projecting horizontally from side walls of the housing, plural height guide elements are present. The height guide elements are placed in registration with the slots and are used for adjusting the spaced distance. That is, at least one of the height guides includes a locking element, e.g. a threaded nut, for locking one of the two vertical portions of the adjustable-height, U-shaped support bar assembly in a selected height position.

The hand scanner support and paper guide apparatus of the invention may also include a lateral adjustment assembly for adjusting a lateral position of the scanner with respect to the planar upper wall. The lateral adjustment assembly may include two rider elements, slidingly engaged with the horizontal portion of the adjustable-height, U-shaped support bar assembly, for positioning the scanner between the rider elements at selected positions along the horizontal portion of the adjustable-height, U-shaped support bar assembly.

The drive assembly may include an electric control assembly for controlling a rate at which the cylindrical roller is driven. The electric control assembly may include a variable resistor connected between the motor and a power source. The variable resistor is for controlling electric energy supplied to the motor, such that motor speed is controlled, whereby speed of the cylindrical roller and speed of movement of the thin sheet is controlled.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved hand scanner support and paper guide apparatus which has all of the advantages of the prior art and none of the disadvantages.

It is another object of the present invention to provide a new and improved hand scanner support and paper guide apparatus which may be easily and efficiently manufactured and marketed.

It is a further object of the present invention to provide a new and improved hand scanner support and paper guide apparatus which is of durable and reliable construction.

An even further object of the present invention is to provide a new and improved hand scanner support and paper guide apparatus which is susceptible of a low cost of manufacture with regard to both materials and labor, and which accordingly is then susceptible of low prices of sale to the consuming public, thereby making such hand scanner support and paper guide apparatus available to the buying public.

Still yet a further object of the present invention is to provide a new and improved hand scanner support and paper guide apparatus that is relatively simple, inexpensive, and portable.

Still another object of the present invention is to provide a new and improved hand scanner support and paper guide apparatus that eliminates uneven texture or blurred images from hand-scanned materials because of uneven hand movement.

Yet another object of the present invention is to provide a new and improved hand scanner support and paper guide apparatus that provides the beneficial features of both a solely mechanical scanner and a solely hand-held scanner.

Even another object of the present invention is to provide a new and improved hand scanner support and paper guide apparatus that provides the versatility and portability of a hand-held scanner and, at the same time, provides the consistency and reproducability of a mechanical scanner.

Still a further object of the present invention is to provide a new and improved hand scanner support and paper guide apparatus that can be retrofitted to hand-held scanners so that they can be mechanically operated when desired.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the hand scanner support and paper guide apparatus of the invention used with a hand-held scanner.

FIG. 2 is an enlarged perspective view of the embodiment of the hand scanner support and paper guide apparatus of the invention shown in FIG. 1 with the hand-held scanner removed.

FIG. 5 is a partial perspective view of a second embodiment of the hand scanner support and paper guide apparatus of the invention showing and adjustable bracket for securing the hand-held scanner.

FIG. 6 is a partial side view of the embodiment shown in FIG. 5 taken along the line 6—6 thereof.

FIG. 7 is a partial perspective view of a third embodiment of the hand scanner support and paper guide apparatus of the invention showing a support for laterally locating the position of the hand-held scanner with respect to a document to be scanned.

FIG. 8 is an electrical schematic diagram of a circuit which permits adjustment or variation of scanning speed.

DESCRIPTION OF THE PREFERRED EMBODIMENT

With reference to the drawings, a new and improved hand scanner support and paper guide apparatus embodying the principles and concepts of the present invention will be described.

Figure 3:
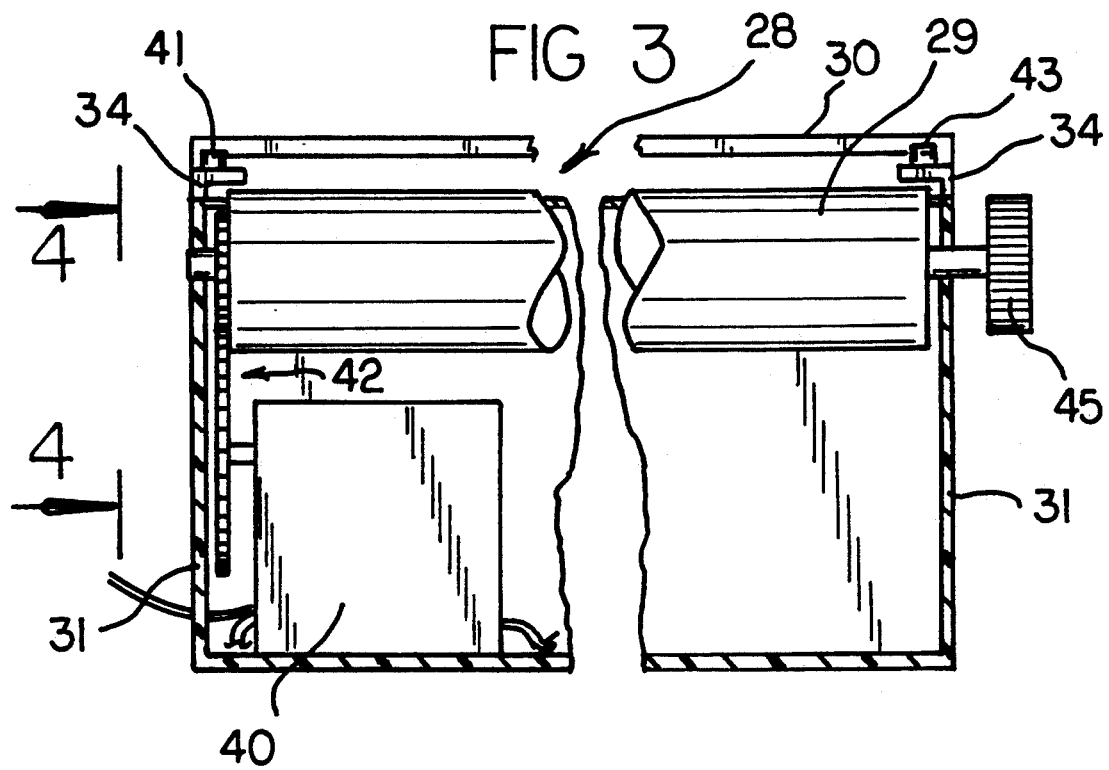
FIG. 3 is a cross-sectional view of the hand scanner support and paper guide apparatus of FIG. 2 taken along line 3—3 thereof.
Figure 4:
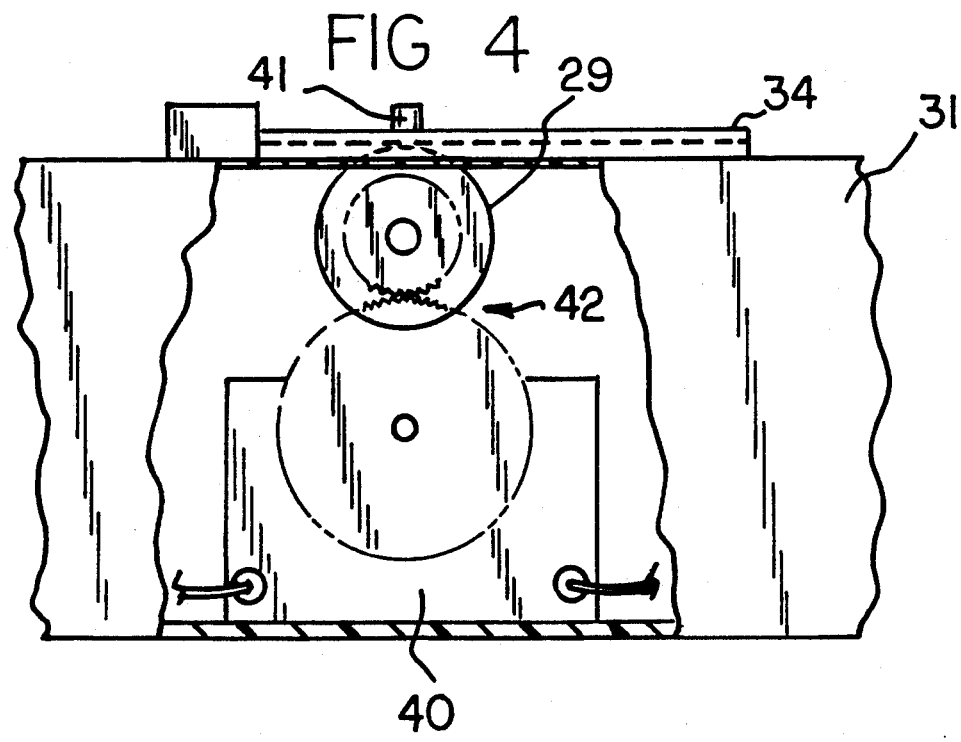
FIG. 4 is a side view, partially broken away, of the embodiment of the invention shown in FIG. 3 taken along the line 4—4 thereof.

Turning initially to FIGS. 1-4, there is shown a first exemplary embodiment of the hand scanner support and paper guide apparatus of the invention generally designated by reference numeral 10. The apparatus of the invention is for mechanically scanning a thin sheet using a scanner 14 designed to be hand-held. The apparatus 10 includes a housing 16 which includes a planar upper wall 18 which serves as a flat surface along which the thin sheet, e.g. a sheet of paper (not shown), is moved. A support assembly 24, connected to the housing 16, supports the scanner 14 a spaced distance 17 above the planar upper wall 18 as the thin sheet is moved past the scanner 14. A guide assembly 26, connected to the housing 16, guides the thin sheet in a straight path as the thin sheet is moved along the planar upper wall 18.

A drive assembly 28, housed within the housing 16, moves the thin sheet past the scanner 14. The drive assembly 28 includes a driven, thin-sheet-contacting element 29, e.g. cylindrical roller 29. A slot 20, in the planar upper wall 18, permits the driven, cylindrical roller 29 to contact and move the thin sheet as it lies on the planar upper wall 18.

More specifically, the drive assembly 28 includes an electric motor 40, a driven, thin-sheet-contacting element 29 comprised of a cylindrical roller 29, a gear assembly 42, and, connected between the electric motor 40 and the cylindrical roller 29, for driving the roller 29 by the motor 40. The cylindrical roller 29 is supported by side walls 31 of the housing 16. Axle 47 extends out from the cylindrical roller 29 and is supported by the housing walls 31. The cylindrical roller 29 can be turned by hand with handle 45 to place the thin sheet in a desired position before scanning is begun.

The scanner support assembly 24 includes a first support element 30 which supports the scanner 14 from below the scanner 14. The scanner support assembly 24 also includes a second support element 32 which supports the scanner 14 from above the scanner 14. The first support element 30 is a U-shaped bar 30 that extends across the planar upper wall 18 in spaced relation thereto. The second support element 32 is a flexible strap 32 which may be made from rubber or other suitable material.

The guide assembly 26 includes a pair of L-shaped bars 34 attached to the housing 16, such that the bars 34 provide lateral guide walls 36 and vertical guide walls 38 spaced from the planar upper wall 18. The flexible strap 32 is secured to cylindrical studs 41 and 43 molded with the L-shaped bars 34.

Turning to FIGS. 5-7, a second embodiment of the hand scanner support and paper guide apparatus of the invention is shown. Reference numerals are shown that correspond to like reference numerals that designate like elements shown in the other figures. In addition, the scanner support assembly 24 includes an adjustable height assembly 50 for adjusting the spaced distance 17 of the scanner 14 above the planar upper wall 18 of the housing 16. The adjustable height assembly 50 includes an adjustable-height, U-shaped support bar assembly 52 which includes a horizontal portion 54 for supporting the scanner 14 and two vertical portions 56, projecting down from the horizontal portion, for adjusting the spaced distance 17 between the scanner (and the top surface of the horizontal portion 54) and the planar upper wall 18 of the housing 16. Each of the two vertical portions 56 includes a slot 58.

The adjustable height assembly 50 also includes plural height guide elements 60 that project horizontally from side walls 31 of the housing 16. The guide elements 60 are in registration with the slots 58 and are used to guide the two vertical portions 56 during height adjustment of the spaced distance 17. At least one of the height guides 60 includes a locking nut 62 for locking one of the two vertical portions 56 of the adjustable-height, U-shaped support bar assembly 52 in a selected position.

Turning to FIG. 7, a third embodiment of the hand scanner support and paper guide apparatus of the invention is shown. Reference numerals are shown that correspond to like reference numerals that designate like elements shown in the other figures. In addition, a lateral adjustment assembly 64 is provided for adjusting a lateral position of the scanner 14 with respect to the planar upper wall 18. The lateral adjustment assembly 64 includes two rider elements 66, slidingly engaged with the horizontal portion 54 of the adjustable-height, U-shaped support bar assembly 52, for positioning the scanner (not shown in this figure) between the rider elements 66 at selected positions along the horizontal portion 54.

As shown in FIG. 8, the drive assembly 28 includes an electric control assembly 44 for controlling a rate at which the cylindrical roller 29 is driven. More specifically, the electric control assembly 44 includes a variable resistor 46, connected between the motor 40 and a power source 48, for controlling electric energy supplied to the motor 40. The energy to the motor 40 is controlled in order to control the speed of the motor. When motor speed is controlled, speed of the cylindrical roller 29 and speed of movement of the thin sheet is controlled. The circuit also includes an on/off switch 35 and a start switch 37.

The electric motor 40 can be a DC motor or an AC motor. When the motor 40 is a DC motor, it can be powered by a portable battery power source 48. The portable battery source can be retained in the housing 16 so that the entire hand scanner support and paper guide apparatus of the invention is portable and self-powered.

The main components of the hand scanner support and paper guide apparatus of the invention can be made from plastic or other inexpensive materials. The cylindrical roller can be a conventional rubberized platen such as used in a conventional typewriter. It is understood that a conventional hand-held scanner may have its own roller that is used in scanning. To begin scanning in accordance with the invention, the cylindrical roller of the invention and the hand-held scanner roller may be positioned to be in contact with each other during scanning of a sheet of paper.

More specifically, the hand scanner support and paper guide apparatus of the invention may be operated as follows. A thin sheet to be scanned is placed face up on the planar upper wall of the housing so that a portion of the thin sheet rests upon the cylindrical roller of the drive assembly. The hand-held scanner is then be placed on a portion of the thin sheet, and the scanner is secured into its scanning position with the flexible strap. The scanning software in the computer (not shown) is then activated, and the on/off switch is turned on. The start switch is then activated, and the scanning operation takes place with the thin sheet being driven by the cylindrical roller and moving past the scanner. After the scanning is complete, the scanning software in the computer is deactivated.

It is apparent from the above that the present invention accomplishes all of the objects set forth by providing a new and improved hand scanner support and paper guide apparatus that is low in cost, relatively simple in design and operation, and which may advantageously be used to combine the versatility and portability of a hand-held scanner and the consistency and reproducability of a mechanical scanner.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A hand scanner support and paper guide apparatus for mechanically scanning a thin sheet using a scanner designed to be hand-held, said apparatus comprising:
    a housing which includes a planar upper wall which serves as a flat surface along which the thin sheet is moved,
    support assembly means, connected to said housing, for supporting the scanner a spaced distance above said planar upper wall as the thin sheet is moved past the scanner,
    guide assembly means, connected to said housing, for guiding the thin sheet in a straight path as the thin sheet is moved along said planar upper wall,
    drive assembly means, housed within said housing, for moving the thin sheet past the scanner, wherein said drive assembly means include a driven, thin-sheet-contacting element,
    a slot, in said planar upper wall, for permitting said driven, thin-sheet-contacting element to contact and move the thin sheet as it lies on said planar upper wall.

2. The apparatus described in claim 1 wherein said scanner support assembly means include a first support element which supports the scanner from below the scanner.

3. The apparatus described in claim 1 wherein said scanner support assembly means include a second support element which supports the scanner from above the scanner.

4. The apparatus described in claim 1 wherein said first support element is a U-shaped bar that extends across said planar upper wall in spaced relation thereto.

5. The apparatus described in claim 3 wherein said second support element is a flexible strap.

6. The apparatus described in claim 1 wherein said guide assembly means include a pair of L-shaped bars attached to said housing, such that said L bars provide lateral guide walls and vertical guide walls spaced from said planar upper wall.

7. The apparatus described in claim 1 wherein said driven, thin-sheet-contacting element of said drive assembly means is comprised of a cylindrical roller.

8. The apparatus described in claim 1 wherein said drive assembly means include:
    an electric motor,
    a driven, thin-sheet-contacting element comprised of a cylindrical roller,
    gear assembly means, connected between said electric motor and said cylindrical roller, for driving said roller by said motor.

9. The apparatus described in claim 1 wherein said cylindrical roller is supported by side walls of said housing.

10. The apparatus described in claim 1 wherein said scanner support assembly means include adjustable height assembly means for adjusting said spaced distance of the scanner above said planar upper wall of said housing.

11. The apparatus described in claim 10 wherein said adjustable height assembly means include:
    an adjustable-height, U-shaped support bar assembly which includes a horizontal portion for supporting the scanner and two vertical portions, projecting down from said horizontal portion, for adjusting said spaced distance of the scanner above said planar upper wall of said housing.

12. The apparatus described in claim 11 wherein each of said two vertical portions includes a slot, and further including:
    plural height guide means, projecting horizontally from side walls of said housing, for registering with said slots and adjusting the spaced distance, wherein at least one of said height guide means includes locking means for locking one of said two vertical portions of said adjustable-height, U-shaped support bar assembly in a selected position.

13. The apparatus described in claim 12 wherein said locking means include a nut.

14. The apparatus described in claim 1, further including lateral adjustment assembly means for adjusting a lateral position of the scanner with respect to said planar upper wall.

15. The apparatus described in claim 14 wherein:
    said lateral adjustment assembly means include two rider elements, slidingly engaged with said horizontal portion, for positioning the scanner between said rider elements at selected positions along said horizontal portion of said adjustable-height, U-shaped support bar assembly.

16. The apparatus described in claim 1 wherein said drive assembly means includes electric control assembly means for controlling a rate at which said cylindrical roller is driven.

17. The apparatus described in claim 16 wherein said electric control assembly means includes variable resistor means, connected between said motor and a power source, for controlling electric energy supplied to said motor, such that motor speed is controlled, whereby speed of said cylindrical roller and speed of movement of the thin sheet is controlled.

* * * * *